United States Patent
Sato et al.

(10) Patent No.: US 10,486,137 B2
(45) Date of Patent: Nov. 26, 2019

(54) ANTICANCER AGENT ADSORBING SHEET BODY

(71) Applicants: FUTAMURA KAGAKU KABUSHIKI KAISHA, Nagoya-shi, Aichi (JP); IWATE MEDICAL UNIVERSITY, Morioka-shi, Iwate (JP)

(72) Inventors: Junya Sato, Morioka (JP); Makoto Yokoi, Minokamo (JP); Kana Sato, Minokamo (JP)

(73) Assignees: FUTAMURA KAGAKU KABUSHIKI KAISHA, Aichi (JP); IWATE MEDICAL UNIVERSITY, Iwate (JP)

(*) Notice: Subject to any disclaimer, the term of this patent is extended or adjusted under 35 U.S.C. 154(b) by 59 days.

(21) Appl. No.: 15/760,179

(22) PCT Filed: Sep. 1, 2016

(86) PCT No.: PCT/JP2016/075671
§ 371 (c)(1),
(2) Date: Mar. 14, 2018

(87) PCT Pub. No.: WO2017/047395
PCT Pub. Date: Mar. 23, 2017

(65) Prior Publication Data
US 2018/0257060 A1 Sep. 13, 2018

(30) Foreign Application Priority Data
Sep. 15, 2015 (JP) .................. 2015-181831
May 13, 2016 (JP) .................. 2016-097120

(51) Int. Cl.
| | | |
|---|---|---|
| B01J 20/28 | (2006.01) |
| A61J 3/00 | (2006.01) |
| B01J 20/20 | (2006.01) |
| B32B 5/24 | (2006.01) |
| B32B 5/02 | (2006.01) |
| B32B 9/00 | (2006.01) |
| B32B 9/04 | (2006.01) |
| B32B 7/08 | (2019.01) |
| B32B 7/12 | (2006.01) |
| B32B 7/14 | (2006.01) |
| B32B 27/10 | (2006.01) |
| B32B 27/30 | (2006.01) |
| B32B 27/32 | (2006.01) |
| B32B 27/36 | (2006.01) |
| B32B 29/02 | (2006.01) |

(52) U.S. Cl.
CPC ........... *B01J 20/28035* (2013.01); *A61J 3/00* (2013.01); *B01J 20/20* (2013.01); *B01J 20/28* (2013.01); *B01J 20/2808* (2013.01); *B01J 20/28038* (2013.01); *B01J 20/28071* (2013.01); *B01J 20/28083* (2013.01); *B32B 5/022* (2013.01); *B32B 5/024* (2013.01); *B32B 5/24* (2013.01); *B32B 7/08* (2013.01); *B32B 7/12* (2013.01); *B32B 7/14* (2013.01); *B32B 9/007* (2013.01); *B32B 9/045* (2013.01); *B32B 9/047* (2013.01); *B32B 27/10* (2013.01); *B32B 27/304* (2013.01); *B32B 27/32* (2013.01); *B32B 27/36* (2013.01); *B32B 29/02* (2013.01); *B32B 2250/03* (2013.01); *B32B 2250/44* (2013.01); *B32B 2262/0238* (2013.01); *B32B 2262/0253* (2013.01); *B32B 2262/0276* (2013.01); *B32B 2262/0284* (2013.01); *B32B 2262/04* (2013.01); *B32B 2262/062* (2013.01); *B32B 2262/065* (2013.01); *B32B 2264/108* (2013.01); *B32B 2307/718* (2013.01); *B32B 2307/726* (2013.01); *B32B 2307/7265* (2013.01); *B32B 2535/00* (2013.01); *B32B 2571/00* (2013.01)

(58) Field of Classification Search
CPC ...... B01J 20/28; B01J 20/28035; B01J 20/20; A61J 3/00
USPC ........................................... 502/402
See application file for complete search history.

(56) References Cited

FOREIGN PATENT DOCUMENTS

| JP | 2862274 B2 | 3/1999 |
| JP | 4301633 B2 | 7/2009 |
| JP | 2009-205009 A | 9/2009 |

(Continued)

OTHER PUBLICATIONS

International Search Report for the Application No. PCT/JP2016/075671 dated Oct. 4, 2016.

*Primary Examiner* — Edward M Johnson
(74) *Attorney, Agent, or Firm* — Cheng Law Group, PLLC (57) ABSTRACT

The invention provides an anticancer agent adsorbing sheet body that exhibits a sufficient effect of adsorbing and retaining highly toxic chemical agents such as anticancer agents, and that further improves safety for health care professionals in medical environments. The anticancer agent adsorbing sheet body 1A comprises, in a laminated form, a drug solution absorbing layer 10a that absorbs a drug solution containing a drug molecule of an anticancer agent, a drug solution-permeating section 20 situated on a first surface 18 side of the drug solution absorbing layer, that causes a drug solution to permeate to the drug solution absorbing layer side, and a permeation preventing section 30 situated on the second surface 19 side of the drug solution absorbing layer, that prevents leakage of the drug solution from the drug solution absorbing layer side, wherein the drug solution absorbing layer comprises an activated carbon-containing sheet member 11 that contains adsorptive activated carbon, the adsorptive activated carbon has a physical property with a mean pore diameter of 1.7 to 5 nm, the drug solution-permeating section is a resin fiber fabric member, and the permeation preventing section is a resin sheet member.

12 Claims, 4 Drawing Sheets (56) References Cited

FOREIGN PATENT DOCUMENTS

| | | | |
|---|---|---|---|
| JP | 2012-183175 | A | 9/2012 |
| JP | 2012-192623 | A | 10/2012 |
| JP | 5062685 | B2 | 10/2012 |

ANTICANCER AGENT ADSORBING SHEET BODY

TECHNICAL FIELD

The present invention relates to an anticancer agent adsorbing sheet body, and particularly to a drug solution absorbing sheet body that adsorbs highly toxic components in a drug solution during preparation of an anticancer agent.

BACKGROUND ART

Anticancer agents are formulations designed to suppress proliferation of cancer cells and, finally, to halt their proliferation or kill them. Their mechanism of action is to invade the target cancer cells and inhibit replication or synthesis of the cellular DNA, inhibit microtubule formation (inhibit cell division), inhibit intracellular metabolism or regulate nutrient-supplying blood flow. Anticancer agents act on malignant transformed cells in this way, provoking cell death by apoptosis or the like, but at the same time they also exhibit high toxicity for normal cells. Caution must therefore be taken when dealing with anticancer agents.

Currently, many chemotherapeutic methods are being adopted that make use of anticancer agents that can be applied for different types of cancer. For anticancer agent therapy, dosages of the anticancer agents are determined by a physician as appropriate for different patients, and are dispensed into a drip infusion container (infusion bag) by a pharmacist based on the prescription. During the operation of preparing an anticancer agent, primary exposure often occurs when droplets or aerosol of the anticancer agent splashing from the injection needle, chemical bottle and drip-feed solution adhere onto the skin of the pharmacist, or are inhaled through the respiratory organs. In addition, secondary exposure may occur when the medicine bag or bottle that has contacted with splashed droplets of the anticancer agent contacts with the skin of the pharmacist. Preparation of anticancer agents is carried out, for the most part, by professional pharmacists. Consequently, there exists a recognized occupational risk of exposure to anticancer agents by health care professionals such as pharmacists or nurses. In particular, there have been reports of miscarriage, leukemia and bladder cancer among health care professionals themselves, resulting from long-term work activities. Measures against exposure to anticancer agents among health care professionals is therefore an extremely important issue.

Currently, waterproof aprons, double-layer gloves and activated carbon-containing masks are worn during anticancer agent preparation procedures. Anticancer agent preparation procedures are carried out in an environment designed to reduce splashing of chemical agents, such as in a biological safety cabinet that prevents aerosols generated during preparation from flowing to the outside, or in sealed formulating appliances. However, environmental contamination cannot be completely avoided in practice. Anticancer agent preparation procedures have been disclosed that are inventions relating to practice kits and the like, and training is being carried out using such practice kits (see PTL 1). In such cases, an absorbing sheet is spread out on the working bench of the safety cabinet.

Normally, anticancer agent droplets that have splashed during preparation of the anticancer agent adhere onto the working sheet spread out under the working environment, and this is thought to minimize secondary dispersion in the working environment. Under the current guidelines, however, working sheets are designated simply as "having a front surface made of an absorbing material and a back surface made of a chemical agent-impermeable material". In other words, the current working sheets have not been designed for the express purpose of preparing anticancer agents. Consequently, what are actually being used are substitutes for absorbing sheets, such as surgical sterilized drapes, or pulp sheets intended to absorb blood, body fluid or excreta. The existing working sheets, therefore, are not always adequate for adsorption of anticancer agents.

The following structures are also existing known technologies for absorbing sheets. For example, paper is attached to both sides of a high-water-absorbing material, and a nonwoven fabric is further attached over it, as a laminated sheet (see PTL 2). Another type is a laminated sheet obtained by laminating an activated carbon-containing sheet between two pulp sheets (see PTL 3). While such laminated sheets exhibit an effect for absorption of common fluids such as urine, they are not always sufficient for adsorption of anticancer agent components that have problematic toxicity.

With the existing absorbing sheets, improvement in the absorption (liquid absorption) performance is considered to be equivalent to increasing the amount of liquid absorption. For the purpose of anticancer agent preparation procedures, however, a higher level of performance is required, whereby the solution containing the drug such as an anticancer agent permeates to a suitable extent and is absorbed, and finally retained. While this is obvious, the aspect of higher safety, which is a desired aspect of performance, still cannot be said to be satisfactory. In light of this situation, there is a need for an absorbing sheet that exhibits higher performance specialized for adsorption of highly toxic chemical agents such as anticancer agents, with an aim toward remedying the exposure of health care professionals to the anticancer agents.

CITATION LIST

Patent Literature

[PTL 1] Japanese Patent Publication No. 5062685
[PTL 2] Japanese Patent Publication No. 2862274
[PTL 3] Japanese Patent Publication No. 4301633

SUMMARY OF INVENTION

Technical Problem

The present inventors have continued to conduct diligent research on materials used for absorbing sheets, with the aim of improving the adsorption performance and retention performance of absorbing sheets for highly toxic chemical agents such as anticancer agents. As a result, an anticancer agent adsorbing sheet body has been developed that has increased permeability for splashed drug solutions, and that can adequately adsorb them in the interior.

The present invention has been accomplished in light of the goal described above, and it provides an anticancer agent adsorbing sheet body that exhibits a sufficient effect of adsorbing and retaining highly toxic chemical agents such as anticancer agents, and that further improves safety for health care professionals in medical environments.

Solution to Problem

Specifically, the first invention relates to an anticancer agent adsorbing sheet body comprising, in a laminated form, a drug solution absorbing layer that absorbs a drug solution containing a drug molecule of an anticancer agent, a drug solution-permeating section situated on a first surface side of the drug solution absorbing layer, that causes a drug solution to permeate to the drug solution absorbing layer side, and a permeation preventing section situated on the second surface side of the drug solution absorbing layer, that prevents leakage of the drug solution from the drug solution absorbing layer side, wherein the drug solution absorbing layer comprises an activated carbon-containing sheet member that contains adsorptive activated carbon, the adsorptive activated carbon has a physical property with a mean pore diameter of 1.7 to 5 nm, the drug solution-permeating section is a resin fiber fabric member, and the permeation preventing section is a resin sheet member.

The second invention relates to an anticancer agent adsorbing sheet body according to the first invention, wherein the drug molecule is a non-volatile molecule.

The third invention relates to an anticancer agent adsorbing sheet body according to the first invention, wherein the molecular weight of the drug molecule is between 100 and 1000.

The fourth invention relates to an anticancer agent adsorbing sheet body according to the first invention, wherein the adsorptive activated carbon has a physical property such that the pore volume of pores with pore diameter of 1 to 100 nm is 0.08 $cm^3/g$ or greater per unit weight of the adsorptive activated carbon, as measured by the DH plot method.

The fifth invention relates to an anticancer agent adsorbing sheet body according to the first invention, wherein the drug solution-permeating section has a water retention of no greater than 500% in a water-retention test according to JIS L 1913 (2010).

The sixth invention relates to an anticancer agent adsorbing sheet body according to the first invention, wherein the drug solution-permeating section is a nonwoven fabric of synthetic resin fibers.

The seventh invention relates to an anticancer agent adsorbing sheet body according to the first invention, wherein the drug solution absorbing layer comprises an activated carbon-containing sheet member that contains adsorptive activated carbon, and a fibrous absorbing sheet member.

The eighth invention relates to an anticancer agent adsorbing sheet body according to the seventh invention, wherein the activated carbon-containing sheet member is situated on the first surface side of the drug solution absorbing layer, and the fibrous absorbing sheet member is situated on the second surface side of the drug solution absorbing layer.

The ninth invention relates to an anticancer agent adsorbing sheet body according to the first invention, wherein the drug solution absorbing layer comprises an activated carbon-containing sheet member that contains adsorptive activated carbon, a water-swelling resin member and a fibrous absorbing sheet member.

The tenth invention relates to an anticancer agent adsorbing sheet body according to the ninth invention, wherein the activated carbon-containing sheet member is situated on the first surface side of the drug solution absorbing layer and the fibrous absorbing sheet member is situated on the second surface side of the drug solution absorbing layer, and the water-swelling resin member is provided between the activated carbon-containing sheet member and the fibrous absorbing sheet member.

The eleventh invention is an anticancer agent adsorbing sheet body according to the seventh invention, wherein the fibrous absorbing sheet member is formed of a cellulose component. The twelfth invention is an anticancer agent adsorbing sheet body according to the ninth invention, wherein the fibrous absorbing sheet member is formed of a cellulose component.

Advantageous Effects of Invention

Since the anticancer agent adsorbing sheet body of the first invention comprises, in a laminated form, a drug solution absorbing layer that absorbs a drug solution containing a drug molecule of an anticancer agent, a drug solution-permeating section situated on a first surface side of the drug solution absorbing layer, that causes a drug solution to permeate to the drug solution absorbing layer side, and a permeation preventing section situated on the second surface side of the drug solution absorbing layer, that prevents leakage of the drug solution from the drug solution absorbing layer side, wherein the drug solution absorbing layer comprises an activated carbon-containing sheet member that contains adsorptive activated carbon, the adsorptive activated carbon has a physical property with a mean pore diameter of 1.7 to 5 nm, the drug solution-permeating section is a resin fiber fabric member, and the permeation preventing section is a resin sheet member, it thereby exhibits an adequate effect of adsorbing and retaining highly toxic chemical agents such as anticancer agents, and can further improve safety for health care professionals in medical environments.

Since the anticancer agent adsorbing sheet body of the second invention is that of the first invention wherein the drug molecule is a non-volatile molecule, the risk of percutaneous absorption is reduced.

Since the anticancer agent adsorbing sheet body of the third invention is that of the first invention wherein the molecular weight of the drug molecule is 100 to 1000, it encompasses virtually all of the currently prescribed anticancer agent drug molecules Since the anticancer agent adsorbing sheet body of the fourth invention is that of the first invention wherein the adsorptive activated carbon has a physical property such that the pore volume of pores with pore diameter of 1 to 100 nm is 0.08 $cm^3/g$ or greater per unit weight of the adsorptive activated carbon, as measured by the DH plot method, it is able to adsorb drug molecules in a wide molecular weight range.

Since the anticancer agent adsorbing sheet body of the fifth invention is that of the first invention wherein the drug solution-permeating section has a water retention of no greater than 500% in a water-retention test according to JIS L 1913 (2010), drug solutions permeate and are absorbed in the drug solution absorbing layer (drug molecule adsorption). Moreover, exposure of drug molecules on the surface section of the drug solution-permeating section is absolutely minimized, and the safety of the drug solution absorbing sheet body is increased by a containment effect.

Since the anticancer agent adsorbing sheet body of the sixth invention is that of the first invention wherein the drug solution-permeating section is a nonwoven fabric of synthetic resin fibers, liquid absorption is minimized.

Since the anticancer agent adsorbing sheet body of the seventh invention is that of the first invention wherein the drug solution absorbing layer comprises an activated carbon-containing sheet member that contains adsorptive activated carbon, and a fibrous absorbing sheet member, the liquid absorbing power of the anticancer agent adsorbing sheet body is reinforced.

Since the anticancer agent adsorbing sheet body of the eighth invention is that of the seventh invention wherein the activated carbon-containing sheet member is situated on the first surface side of the drug solution absorbing layer, and the fibrous absorbing sheet member is situated on the second surface side of the drug solution absorbing layer, moisture of the drug solution that could not be thoroughly absorbed in the drug solution absorbing layer can be absorbed by the fibrous absorbing sheet member directly under it.

Since the anticancer agent adsorbing sheet body of the ninth invention is that of the first invention wherein the drug solution absorbing layer comprises an activated carbon-containing sheet member that contains adsorptive activated carbon, a water-swelling resin member and a fibrous absorbing sheet member, the liquid absorbing power of the anticancer agent adsorbing sheet body is further reinforced.

Since the anticancer agent adsorbing sheet body of the tenth invention is that of the ninth invention wherein the activated carbon-containing sheet member is situated on the first surface side of the drug solution absorbing layer and the fibrous absorbing sheet member is situated on the second surface side of the drug solution absorbing layer, and the water-swelling resin member is provided between the activated carbon-containing sheet member and the fibrous absorbing sheet member, moisture of the drug solution that could not be thoroughly absorbed by the drug solution absorbing layer can be absorbed by the water-swelling resin member and the fibrous absorbing sheet member directly under it.

Since the anticancer agent adsorbing sheet body of the eleventh invention is that of the seventh invention wherein the fibrous absorbing sheet member is formed of a cellulose component, the high hydrophilicity of the cellulose component is utilized for liquid absorption. Moreover, since the anticancer agent adsorbing sheet body of the twelfth invention is that of the ninth invention wherein the fibrous absorbing sheet member is formed of a cellulose component, the high hydrophilicity of the cellulose component is utilized for liquid absorption.

DESCRIPTION OF EMBODIMENTS

The anticancer agent adsorbing sheet body of the invention is a type of adsorbing sheet body used primarily as a measure against exposure of health care professionals involved in preparation of and treatment with anticancer agents and the like. In particular, it is an adsorbing sheet body that can effectively counter even secondary dispersion when chemical agent that has splashed during filling undergoes further splashing. The cross-sectional diagrams of FIG. 1 to FIG. 3 will now be used to explain the structure and properties of the anticancer agent adsorbing sheet body of each embodiment.

First Embodiment

Figure 1:
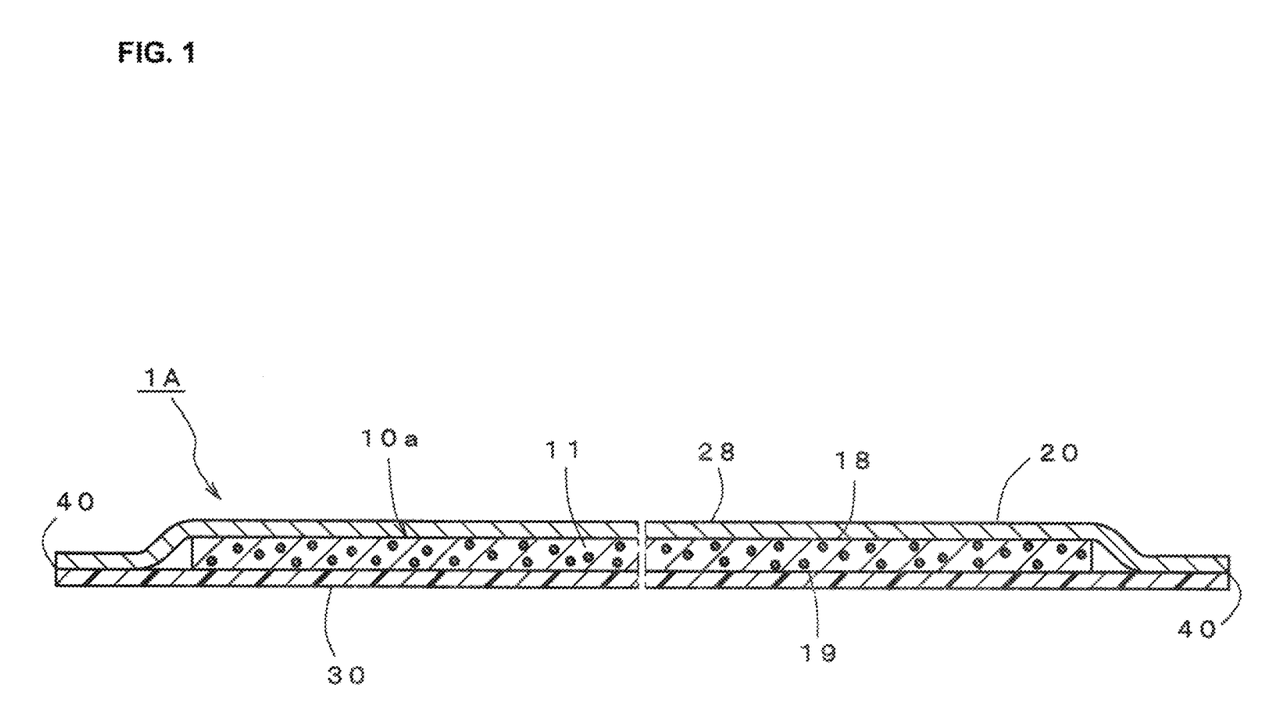
FIG. 1 is a cross-sectional view of an anticancer agent adsorbing sheet body according to a first embodiment of the invention.

The cross-sectional diagram (schematic diagram) of FIG. 1 shows an anticancer agent adsorbing sheet body 1A according to the first embodiment. The anticancer agent adsorbing sheet body 1A is provided with a drug solution absorbing layer 10a at its center. The first surface side of the drug solution absorbing layer 10a (the upper side as shown) is provided with a drug solution-permeating section 20. Likewise, the second surface side of the drug solution absorbing layer 10a (the lower side as shown) is provided with a permeation preventing section 30. Thus, the anticancer agent adsorbing sheet body 1A is formed as a layered structure comprising three layers that are at least: the drug solution-permeating section 20, the drug solution absorbing layer 10a and the permeation preventing section 30.

(Drug Solution Absorbing Layer)

The function of the drug solution absorbing layer 10a is to absorb drug solution, and to adsorb the drug molecules of the anticancer agent in the drug solution. The drug solution that is to be absorbed will generally be a drug solution containing a drug molecule with a molecular weight in the range of 100 to 1000. This molecular weight range for drug molecules is a range of molecular weight corresponding to the major anticancer agents that are currently in use.

The operation of preparing an anticancer agent is generally carried out in a safety cabinet. Since the interior of a cabinet is at negative pressure, the internally diffused volatile components are drawn into the cabinet. When the drug molecule is non-volatile, however, this increases the risk that splashed droplets will permeate from sites of adhesion into the body of the health care professional, through the hands or arms. Furthermore, droplets of the anticancer agent that have splashed inside the safety cabinet during preparation sometimes adhere onto medicine bags or bottles carried into the safety cabinet, or onto other equipment. When this occurs, the drug molecules of the anticancer agent can potentially diffuse out of the safety cabinet by adhering to such objects. In other words, secondary contamination is likely to occur. Another concern is adhesion of drugs onto physicians and nurses in clinical settings as well, by leakage during medication of patients.

In such cases, the risk of percutaneous absorption is even higher if the drug molecule is a non-volatile molecule at ordinary temperature. When a drug solution absorbing sheet body is spread out, the drug solution containing the non-volatile drug molecules is absorbed, and the risk of percutaneous absorption is reduced. Therefore, the drug solution to be absorbed by the drug solution absorbing sheet body is one containing a non-volatile drug molecule having a molecular weight in the range of 100 to 1000. Drug molecules in this molecular weight range presumably will not volatilize at ordinary temperature, unlike the ammonia in urine (molecular weight: 14.0).

The following are some typical anticancer agents and their molecular weights: paclitaxel (molecular weight: 853.91), cyclophosphamide (molecular weight: 279.10), irinotecan (molecular weight: 677.18), 5-fluorouracil (molecular weight: 130,08), adriamycin (molecular weight: 579.98), methotrexate (molecular weight: 454.44), dacarbazine (molecular weight: 182.18), cytarabine (molecular weight: 243.22), vincristine (molecular weight: 923.04), gemcitabine (molecular weight: 299.66), mitoxantrone (molecular weight: 517.40), mitomycin (molecular weight: 334.33), epirubicin (molecular weight: 543.52), etoposide (molecular weight: 588.56), cisplatin (molecular weight: 300.05) and carboplatin (molecular weight: 371.25).

Considering the molecular weight ranges of the listed drug molecules, therefore, there is convergence to an approximate range of 100 to 1000. That is, it encompasses virtually all of the currently prescribed anticancer agent drug molecules. In terms of actual molecular adsorption in the molecular weight range of 100 to 1000, the risk during preparation of the anticancer agents is greatly reduced.

Adsorptive activated carbon is used for adsorption of drug molecules in the drug solution absorbing layer 10a. In addition, a material with excellent liquid absorption is necessary in order to accomplish absorption in a drug solution state. Moreover, since disposable utensils are for one-way use, they must be prepared with an inexpensive finish. With this in mind, the drug solution absorbing layer 10a is provided with an activated carbon-containing sheet containing adsorptive activated carbon.

The adsorptive activated carbon is selected from among activated carbon exhibiting the physical property of a mean pore diameter of 1.7 to 5 nm, as in the examples described below, for adsorption of drug molecules (anticancer agent drug components) in a molecular weight in the range of 100 to 1000. Activated carbon with a mean pore diameter of less than 1.7 nm has a mean pore diameter that is too small and unsuited for adsorption of drug molecules. Activated carbon with a mean pore diameter of greater than 5 nm has an excessively large mean pore diameter which is insufficient for capturing (immobilizing) drug molecules that have infiltrated into the pores, and they would be expected to be desorbed.

Adsorptive activated carbon has, in addition to the aforementioned physical property of mean pore size, also the physical property of pore volume. In this case, for analysis of the pore distribution of adsorptive activated carbon by the DH plot method (Dollimore-Heal method, or DH method), it is a physical property such that the pore volume of pores with pore diameters of 1 to 100 nm is 0.08 $cm^3/g$ or greater, per unit weight of the adsorptive activated carbon. The DH plot method generally allows analysis of the distribution of mesopores with diameters of 1 nm to 100 nm to be carried out in a relatively easy manner. Thus, the DH plot method can be advantageously used for analysis of pores with a distribution in the diameter range specified above.

The upper limit for the pore volume per unit weight of the adsorptive activated carbon will vary depending on the type of activated carbon used and the method of activation, but may generally be about 2 $cm^3/g$, in light of the examples described below. When the pore volume is less than 0.08 $cm^3/g$, the adsorption capacity for drug molecules will be reduced due to the low pore volume of the activated carbon. In particular, considering the form of the anticancer agent adsorbing sheet body, it may not be possible to fill it with a large amount of activated carbon. It is necessary to efficiently adsorb drug molecules with a wide range of molecular weights under constrained conditions. Consequently, the index used in the DH plot method is highly significant in that it allows evaluation of the pore volume per unit weight of the adsorptive activated carbon.

The starting material for the adsorptive activated carbon may be coconut shell, sawdust, scrap wood, bamboo scrap, coal, petroleum pitch, phenol resin or the like. After such materials have been carbonized, they are subjected to activation treatment such as steam-activation, zinc chloride activation, phosphoric acid activation, sulfuric acid activation, air activation or carbon dioxide gas activation. This results in formation of pores in the activated carbon.

As described in detail above, the adsorptive activated carbon has the physical property of comprising pores corresponding to the molecular weights of drug molecules of the major anticancer agents that are currently in use. Therefore, the anticancer agent adsorbing sheet body exhibits an effect of efficiently adsorbing drug molecules and of maintaining that state. However, when retaining with adsorptive activated carbon, it is not possible to properly absorb and retain the moisture of the drug solution by the activated carbon alone. The adsorptive activated carbon is therefore used in the form of an activated carbon-containing sheet member 11.

The activated carbon-containing sheet member 11 is a sheet comprising, for example, a mixture of a fibrous substance and adsorptive activated carbon. The fibrous substance is selected from among fiber materials, such as paper and pulp that have excellent relative water absorbing properties, as well as cotton, hemp and rayon. These fibrous substances and adsorptive activated carbon may be combined in an appropriate manner. For example, the adsorptive activated carbon may be inserted between thin layers of fabrics (woven fabrics or nonwoven fabrics). Alternatively, the paper or fibers may be prepared as a slurry and the adsorptive activated carbon dispersed therein and worked into a sheet by a paper-making procedure. The formation is by a method similar to a paper making method. The drug solution absorbing layer 10 is formed in this manner.

<Drug Solution-Permeating Section>

The role of the drug solution-permeating section 20 situated on the first surface 18 of the drug solution absorbing layer 10a is to protect the drug solution absorbing layer 10a, while also allowing the drug solution that has fallen onto the drug solution absorbing sheet body to permeate as far as possible to the drug solution absorbing layer 10a side without it being overly absorbed at the drug solution-permeating section 20.

Absorption of the drug solution at the drug solution-permeating section 20 may at first appear to be free of problems. However, the drug molecule in the drug solution is not adsorbed in the drug solution-permeating section 20 alone, as only absorption of the drug solution takes place. When this occurs, the drug molecules of the anticancer agent remaining in the drug solution-permeating section 20 can potentially adhere onto the medicine bag or flask that is in contact with the drug solution-permeating section 20, causing contamination to spread through them. Or in some cases, after the drug solution has dried, the drug molecule of an anticancer agent will tend to be more easily exposed on the front surface of the drug solution-permeating section 20. This makes it more difficult to capture drug molecules, and also raises concerns in terms of safety. Therefore, it is a desired property for the drug solution-permeating section 20 that the drug solution should appropriately permeate and undergo absorption in the drug solution absorbing layer 10a (adsorption of the drug molecules). As a result, exposure of drug molecules on the surface 28 section of the drug solution-permeating section 20 will be absolutely minimized, and the safety of the drug solution absorbing sheet body will be increased by a containment effect.

It is therefore formed of a material with relatively low or minimal liquid absorption (water absorption) compared to the drug solution absorbing layer 10a (a hydrophobic material). The drug solution-permeating section 20 is formed of a resin fiber fabric member. The resin fiber fabric member is a woven fabric of synthetic resin fibers or a nonwoven fabric of synthetic resin fibers, in consideration of minimizing liquid absorption. The synthetic resin fibers are made of an easily obtainable resin material such as polyethylene (PE), polypropylene (PP), polyvinyl chloride (PVC) or polyethylene terephthalate (PET). Naturally, other resin materials such as polylactic acid may be used. The form of the woven fabric or nonwoven fabric may be selected as desired. For carrying out the examples, a nonwoven fabric was selected because the basis weight (density) of a nonwoven fabric member is lower than that of a woven fabric.

The permeation performance of the drug solution in the drug solution-permeating section 20 can be evaluated under the criteria in "Common nonwoven fabric test method", 6.9 Water absorption, 6.9.2 Water-retention test, according to JIS L 1913 (2010). In this standard test, the water retention is preferably no greater than 500% and more preferably no greater than 250%. If the water retention exceeds 500%, a greater amount of the drug solution will be retained in the drug solution-permeating section 20, thus running counter to the desired permeation. The reason why the water retention is not 0% is that the drug solution-permeating section 20 itself is a woven fabric or nonwoven fabric, and is thus fibrous. This is because it is impossible to avoid some extent of internal residue due to the effect of the surface tension of the drug solution.

(Permeation Preventing Section)

The role of the permeation preventing section 30 situated on the second surface 19 of the drug solution absorbing layer 10a is to protect the drug solution absorbing layer 10a, while also causing the drug solution that has fallen onto the drug solution absorbing sheet body to be stopped by the permeation preventing section 30 without permeating through and leaking out to the exterior. In other words, leakage of the drug solution from the drug solution absorbing sheet body is prevented.

The permeation preventing section 30 is formed by a resin sheet member, in order to be impermeable to moisture. A resin film is included in the permeation preventing section 30. From the viewpoint of waterproofness, the resin sheet member is formed of an easily obtainable resin such as polyethylene (PE), polypropylene (PP), polyvinyl chloride (PVC) or polyethylene terephthalate (PET). Another resin material such as polylactic acid may also be added. The resin sheet member has a commonly available layer thickness and is produced by a publicly known film forming method such as uniaxial stretching or biaxial stretching, or without stretching.

There are no particular restrictions on the method for mutually anchoring the drug solution-permeating section 20 and permeation preventing section 30 that sandwich the drug solution absorbing layer 10a from above and below. At the edge section 40 in FIG. 1, the drug solution-permeating section 20 and permeation preventing section 30 are bonded by an adhesive and also mutually bonded by a hot-melting method (heat-fusion of the permeation preventing section 30) or the like, with the drug solution absorbing layer 10a fixed in the interior. The adhesive may be any of various types of resins, such as an epoxy resin, acrylate resin or ethylene-vinyl acetate resin, for example. The hot-melting may be carried out using a clamped apparatus with a heating plate or a clamped apparatus with ultrasonic vibration. It may also be anchored by being sewed.

Second Embodiment

Figure 2:
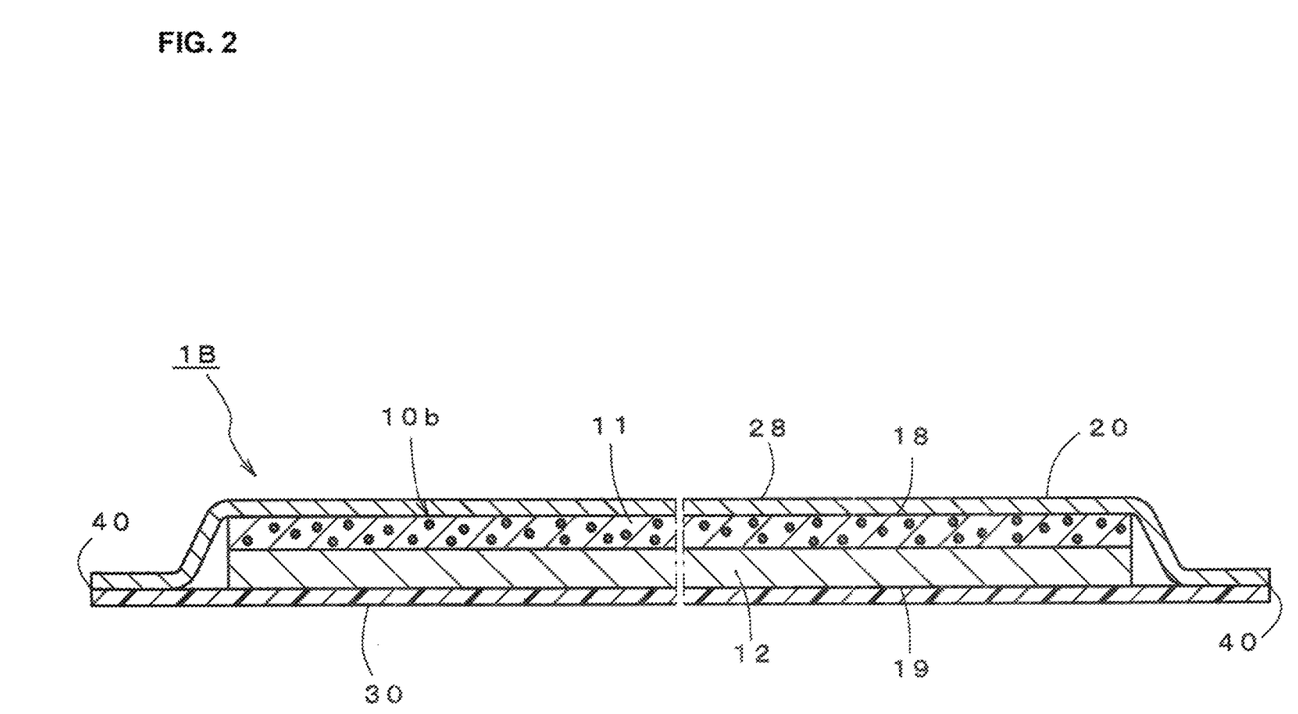
FIG. 2 is a cross-sectional view of an anticancer agent adsorbing sheet body according to a second embodiment of the invention.

The cross-sectional diagram (schematic diagram) of FIG. 2 shows an anticancer agent adsorbing sheet body 1B according to the second embodiment. In the anticancer agent adsorbing sheet body 1B of the second embodiment, the activated carbon-containing sheet member 11 and fibrous absorbing sheet member 12 are provided in the drug solution absorbing layer 10b situated at the center of the sheet body. The drug solution-permeating section 20 and permeation preventing section 30 sandwiching the drug solution absorbing layer 10b from above and below are the same as the first embodiment. With the anticancer agent adsorbing sheet body 1B, therefore, the liquid absorbing power of the fibrous absorbing sheet member 12 is further provided as reinforcement, in addition to the activated carbon-containing sheet member 11. Therefore, when a large amount of drug solution has spilled onto the anticancer agent adsorbing sheet body 1B, the drug solution that is not fully absorbed by the activated carbon-containing sheet member 11 is absorbed into the fibrous absorbing sheet member 12. This results in increased safety of the anticancer agent adsorbing sheet body 1B.

The fibrous absorbing sheet member 12 in the drug solution absorbing layer 10b is formed from a known fibrous material with a high water absorbing property. Specifically, it may be a woven fabric or nonwoven fabric formed from cotton, hemp or regenerated cellulose fiber, or a sheet member composed of paper consisting of a pulp starting material. These fibrous absorbing sheet members are similar in that they are formed of cellulose components. Cellulose generally includes numerous hydroxyl groups in the molecule, and is therefore hydrophilic. The high hydrophilicity is utilized for liquid absorption.

The upper/lower relationship between the activated carbon-containing sheet member 11 and the fibrous absorbing sheet member 12 composing the drug solution absorbing layer 10b of the anticancer agent adsorbing sheet body 1B is not restricted in principle. In any case, the drug solution absorbing layer 10b itself is sandwiched between the drug solution-permeating section 20 and the permeation preventing section 30, and is not exposed. Consequently, if the drug solution is absorbed by the drug solution absorbing layer 10b, outer diffusion of the drug molecules of the anticancer agent will be reduced.

As shown by the cross-sectional diagram in FIG. 2, the activated carbon-containing sheet member 11 is situated on the first surface 18 side of the drug solution absorbing layer 10b, and the fibrous absorbing sheet member 12 is situated on the second surface 19 side of the drug solution absorbing layer 10b. With this upper/lower arrangement, drug molecules of the anticancer agent in the drug solution that have permeated through the drug solution-permeating section 20 of the anticancer agent adsorbing sheet body 1B are first adsorbed by the adsorptive activated carbon in the activated carbon-containing sheet member 11 of the drug solution absorbing layer 10b. The drug solution is also impregnated into the same activated carbon-containing sheet member 11. In addition, moisture and the like from the drug solution that could not be thoroughly absorbed by the drug solution absorbing layer 10b is absorbed by the fibrous absorbing sheet member 12 directly under it. A double strategy is thus employed for absorption of the drug solution. The activated carbon-containing sheet member 11 is particularly likely to contact with the drug molecules of the anticancer agent first, thereby further increasing the effect of adsorbing (capturing) by the adsorptive activated carbon.

Third Embodiment

Figure 3:
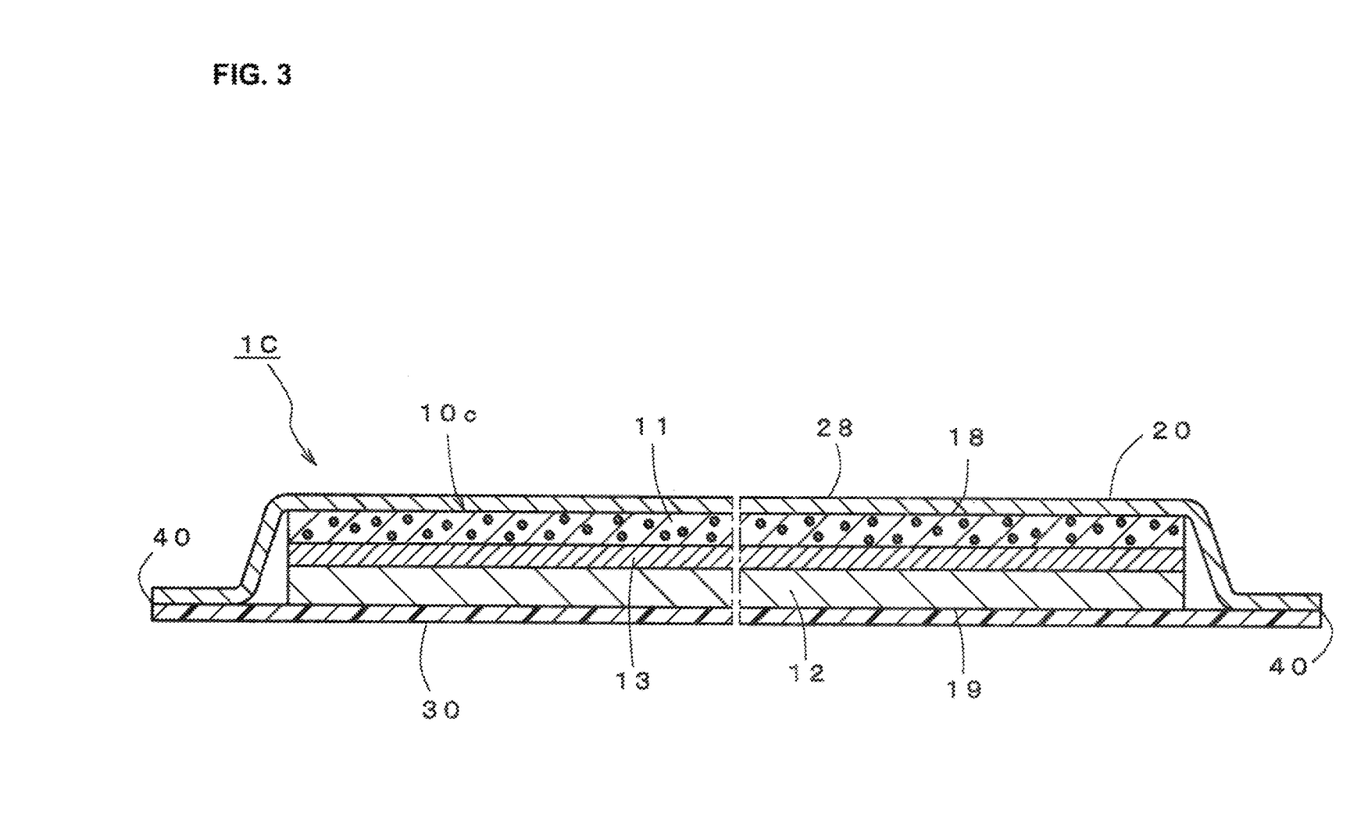
FIG. 3 is a cross-sectional view of an anticancer agent adsorbing sheet body according to a third embodiment of the invention.

The cross-sectional diagram (schematic diagram) of FIG. 3 shows an anticancer agent adsorbing sheet body 1C according to the third embodiment. In the anticancer agent adsorbing sheet body 1C of the third embodiment, the drug solution absorbing layer 10c situated at the center of the sheet body is provided with the activated carbon-containing sheet member 11, a water-swelling resin member 13 and the fibrous absorbing sheet member 12. The drug solution-permeating section 20 and permeation preventing section 30 sandwiching the drug solution absorbing layer 10c from above and below are the same as the first embodiment. Moreover, the fibrous absorbing sheet member 12 is the same as described for the second embodiment.

In the anticancer agent adsorbing sheet body 1C, the liquid absorbing power of the fibrous absorbing sheet member 12 and the water-swelling resin member 13 is further provided as reinforcement, in addition to the activated carbon-containing sheet member 11. Therefore, when a large amount of drug solution has spilled onto the anticancer agent adsorbing sheet body 1C, the drug solution that is not fully absorbed by the activated carbon-containing sheet member 11 is absorbed into the fibrous absorbing sheet member 12 and the water-swelling resin member 13. This results in even further increased safety of the anticancer agent adsorbing sheet body 1C.

In the anticancer agent adsorbing sheet body 1C, the water-swelling resin member 13 that is included in the drug solution absorbing layer 10c is a commonly used water-absorbing material (water-absorbent polymer). For example, it may be a polymer resin material such as crosslinked carboxymethyl cellulose or crosslinked polyacrylate polymer (sodium polyacrylate-based). The water-swelling resin member 13 is obtained by working a polymer resin into the form of a sheet (which includes a fiber woven fabric or nonwoven fabric form), beads (granular form) or powder, and is situated in the drug solution absorbing layer 10c.

The upper/lower relationship between the activated carbon-containing sheet member 11, the fibrous absorbing sheet member 12 and the water-swelling resin member 13 composing the drug solution absorbing layer 10c of the anticancer agent adsorbing sheet body 1C is not restricted in principle. Regardless of the upper/lower order, the drug solution absorbing layer 10c itself is sandwiched between the drug solution-permeating section 20 and the permeation preventing section 30, and is not exposed. Consequently, if the drug solution is absorbed by the drug solution absorbing layer 10c, outer diffusion of the drug molecules of the anticancer agent will be reduced.

As shown by the cross-sectional diagram in FIG. 3, the activated carbon-containing sheet member 11 is situated on the first surface 18 side of the drug solution absorbing layer 10c, and the fibrous absorbing sheet member 12 is situated on the second surface 19 side of the drug solution absorbing layer 10c. Furthermore, the water-swelling resin member 13 is provided between the activated carbon-containing sheet member 11 and the fibrous absorbing sheet member 12. With this arrangement, drug molecules of the anticancer agent in the drug solution that have permeated through the drug solution-permeating section 20 of the anticancer agent adsorbing sheet body 1C are first adsorbed by the adsorptive activated carbon in the activated carbon-containing sheet member 11 of the drug solution absorbing layer 10c. The drug solution is also impregnated into the same activated carbon-containing sheet member 11. In addition, moisture and the like from the drug solution that could not be thoroughly absorbed by the drug solution absorbing layer 10c is absorbed by the water-swelling resin member 13 and fibrous absorbing sheet member 12 directly under it. Thus, a triple strategy is employed for adsorption of the drug solution, so that a higher level of performance is exhibited. The activated carbon-containing sheet member 11 is particularly likely to contact with the drug molecules of the anticancer agent first, thereby further increasing the effect of adsorption (capturing) by the adsorptive activated carbon.

Instead of a sheet form, the water-swelling resin member 13 may be present in an amorphous form, such as beads. For stable retention, it is preferably situated between the activated carbon-containing sheet member 11 and the fibrous absorbing sheet member 12.

[Anchoring]

The drug solution absorbing layer 10b of the anticancer agent adsorbing sheet body 1B of the second embodiment (see FIG. 2) and the drug solution absorbing layer 10c of the anticancer agent adsorbing sheet body 1C of the third embodiment (see FIG. 3), as described above, clearly have laminated structures. If the individual layer members of the drug solution absorbing layer become separated from each other, gaps will increase between the layers, and the drug solution will permeate through the drug solution-permeating section and potentially result in lower absorption performance when it reaches the drug solution absorbing layer. In other words, the moisture absorption speed will be reduced. In addition, the anticancer agent adsorbing sheet body itself will increase in thickness, which is undesirable for folding and storing efficiency. In consideration of these factors, each layer member of the drug solution absorbing layer is therefore appropriately joined. When joining the members together, the method used may be anchoring with an adhesive, or contact bonding by embossing.

In the anticancer agent adsorbing sheet bodies 1A, 1B and 1C of the embodiments, the drug solution absorbing layer 10a, 10b or 10c and the drug solution-permeating section 20 situated on the first surface side, and the drug solution absorbing layer 10a, 10b or 10c and the permeation preventing section 30 situated on the second surface side, are respectively joined. This also provides an effect of reducing gaps in the members and reducing the overall thickness.

The joining between the drug solution absorbing layer 10a, 10b or 10c and the drug solution-permeating section 20 may be anchoring with an adhesive, contact bonding by embossing, or hot-melting. Heat fusion is facilitated if the drug solution-permeating section is a fabric member composed of synthetic resin fibers. The joining is not over one side, but is rather mutual anchoring of separated gaps by points or lines. A special adhesive is used for joining between the drug solution absorbing layer 10a, 10b or 10c and the permeation preventing section 30. The significance of the permeation preventing section is to prevent leakage of the drug solution containing drug molecules of the anticancer agent, that has dropped down onto the anticancer agent adsorbing sheet body. A joining method that produces holes or cracks in the permeation preventing section cannot be employed, as it is necessary to increase the waterproofness. The anchoring is therefore with an adhesive, from the viewpoint of safety. This joining, as well, is not over one side but is rather mutual anchoring of separated gaps by points or lines.

EXAMPLES

The present inventors judged the nature and physical properties of the major structural members when preparing an anticancer agent adsorbing sheet body. It was also attempted to evaluate anticancer agent adsorbing sheet bodies when using drugs during preparation of actual anticancer agents.

[Performance Evaluation and Selection of Drug Solution-Permeating Section]

The property desired for the member used in the drug solution-permeating section is that of minimizing absorption of drug solution in the drug solution-permeating section, while causing the dripped drug solution to pass through (permeate) as much as possible. For this, we employed "Common nonwoven fabric test methods", 6.9 Water absorption (JIS), 6.9.2 (Water-retention), according to JIS L 1913 (2010). The following eight types of fabric members 1 to 8 were prepared based on the above criteria and supplied for the Common nonwoven fabric test. The water retention (%) values for each fabric member were measured and their performance evaluated.

Each fabric member was cut into a square with 50 mm sides, and the weight was measured (1 mg unit). The cut fabric member was immersed in a vat filled with ion-exchanged water for 15 minutes. After immersion, the fabric member was taken out of the vat and the water was allowed to drip out for 1 minute. The weight was then measured (1 mg unit). The water retention was calculated from the weight difference before and after immersion of the fabric member in water. Three samples were measured for each fabric member (n=3), and the arithmetic mean value was recorded as the water retention (%) for the fabric member.

(Fabric Member)

Fabric member 1: 05TH-24 by Hirose Paper Mfg. Co., Ltd., material: polyethylene terephthalate, nonwoven fabric form, basis weight: 25.6 g/m$^2$.

Fabric member 2: 05EP-26 by Hirose Paper Mfg. Co., Ltd., material: polyethylene terephthalate and polypropylene, nonwoven fabric form, basis weight: 26.4 g/m$^2$.

Fabric member 3: 9716-F0 by Shinwa Co. Ltd., material: polyethylene terephthalate and polyethylene, nonwoven fabric form, basis weight: 16.0 g/m$^2$.

Fabric member 4: UL-S by Toyo Paper Mfg. Co. Ltd., material: polypropylene and polyethylene, nonwoven fabric form, basis weight: 18.0 g/m$^2$.

Fabric member 5: 05EP-23 by Hirose Paper Mfg. Co., Ltd., material: polyethylene terephthalate and polypropylene, nonwoven fabric form, basis weight: 23.4 g/m$^2$.

Fabric member 6: 05EP-35 by Hirose Paper Mfg. Co., Ltd., material: polyethylene terephthalate and polypropylene, nonwoven fabric form, basis weight: 35.4 g/m$^2$.

Fabric member 7: TCF#8022 by Futamura Chemical Co., Ltd., material: rayon, nonwoven fabric form, basis weight: 22.0 g/m$^2$.

Fabric member 8: I/CXX25-#25-330 by Marusan Industry Co., Ltd., material: cotton, nonwoven fabric form, basis weight: 25.0 g/m$^2$.

The results are shown in Table 1. For the materials in Table 1, PET represents polyethylene terephthalate, PE, represents polyethylene and PP represents polypropylene. Shown in the table are, in order from the top, the form, material, basis weight (g/m$^2$), water retention (%) and performance evaluation. For the performance evaluation, a water retention of <500% is indicated by "A", and that of ≥500% is indicated by "F". Since virtually no wetness is felt when touched by the hand with a water retention of <500%, this was used as the fixed delimiting value.

TABLE 1

| | Fabric member 1 | Fabric member 2 | Fabric member 3 | Fabric member 4 | Fabric member 5 | Fabric member 6 | Fabric member 7 | Fabric member 8 |
|---|---|---|---|---|---|---|---|---|
| Form | Nonwoven fabric | Nonwoven fabric | Nonwoven fabric | Nonwoven fabric | Nonwoven fabric | Nonwoven fabric | Nonwoven fabric | Nonwoven fabric |
| Material | PET | PET/PP | PET/PE | PP/PE | PET/PP | PET/PP | Rayon | Cotton |
| Basis weight (g/m$^2$) | 25.6 | 26.4 | 16.0 | 18.0 | 23.4 | 35.4 | 22.0 | 25.0 |
| Water retention | 138 | 211 | 52 | 452 | 139 | 181 | 1310 | 1808 |
| Evaluation | A | A | A | A | A | A | F | F |

(Water Retention)

Fabric members 1 to 6, which were formed from synthetic resin fiber materials, all had low water retention, though with some variation. In contrast, the water retention was increased with fabric members 7 and 8 which had rayon (from cellulose) and cotton (cellulose). While the synthetic resin fiber fabric members are affected by surface tension, it may be assumed that water absorption by the fabric members themselves was reduced by their hydrophobic nature. Thus, for construction of the drug solution-permeating section it is preferred to use a fabric member (nonwoven fabric) composed of resin fibers, and particularly synthetic resin fibers.

[Performance Evaluation and Selection of Adsorptive Activated Carbon]

The adsorptive activated carbon is the main component that adsorbs drug molecules of the anticancer agent in the anticancer agent adsorbing sheet body. Therefore, the eight different adsorptive activated carbons 1 to 8, and nine different synthetic zeolites, were evaluated for their level of molecular adsorption capacity. However, anticancer agents are expensive and care must be taken when handling them due to problems of toxicity. Thus, for evaluation of the adsorption performance, compounds that are analogs of the drug molecules of currently prescribed anticancer agents were used as substitutes, for measurement of the adsorption capacities of the activated carbons.

<Adsorbent Materials>

All of the adsorptive activated carbons 1 to 8 used were activated carbon by Futamura Chemical Co., Ltd.

Adsorptive activated carbon 1: Powdered activated carbon "S" (wood-based)

Adsorptive activated carbon 2: Powdered activated carbon "IP" (wood-based)

Adsorptive activated carbon 3: Powdered activated carbon "CI" (coconut shell)

Adsorptive activated carbon 4: Powdered activated carbon "CB" (coconut shell)

Adsorptive activated carbon 5: Powdered activated carbon "GB" (coal-based)

Adsorptive activated carbon 6: Powdered activated carbon "CN480S" (coconut shell)

Adsorptive activated carbon 7: Powdered activated carbon "CW480AL" (coconut shell)

Adsorptive activated carbon 8: Fibrous activated carbon "ACF" (phenol resin-based)

Table 2 lists the physical properties and other details. As an activated carbon control there was used the synthetic zeolite "ZEOLAM F-9" by Tosoh Corp, Adsorptive activated carbons 6, 7 and 8 were ground to a median diameter of approximately 15 μm with a sample mill and provided for the subsequent test.

<Measurement of Physical Properties of Adsorptive Activated Carbons>

Measurement of the median diameter (μm) was performed using a "SALD-3000" Laser diffraction particle size distribution analyzer by Shimadzu Corp. The "median diameter" for this measurement is the particle size at 50% in the cumulative distribution determined by laser diffraction/scattering (the cumulative mean diameter).

The specific surface area ($m^2/g$) was determined by the BET method, measuring the nitrogen adsorption isotherm at 77K with a "BELSORP-miniII" automatic specific surface area/pore distribution measuring apparatus by Microtrac-Bell.

The mean pore diameter and DH plot pore volume ($V_D$) were determined using the apparatus used for measurement of the specific surface area. The total pore volume ($cm^3/g$ (or cc/g)) in a pore diameter range of 1 nm to 100 nm was determined using the same apparatus, by the DH method based on Gurvitsch's law, converting the nitrogen adsorption (V) at a relative pressure of 0.953 to liquid nitrogen volume ($V_p$) using the following mathematical formula (i). In mathematical formula (i), $M_g$ represents the molecular weight of the adsorbate (nitrogen: 28.020), and $\rho_g$ ($g/cm^3$) represents the density of the adsorbate (nitrogen: 0.808).

[Mathematical Formula 1]

Liquid nitrogen volume ($V_p$)=[nitrogen adsorption (V) at relative pressure of 0.953]×$M_g$/22414×$\rho_g$ (i)

The mean pore diameter (nm) was determined by the following mathematical formula (ii), using the pore volume (cc/g) and specific surface area ($m^2/g$) obtained by the measurement described above, assuming circular cylindrical pore shapes.

[Mathematical Formula 2]

Mean pore diameter (nm)=[pore volume (mL/g)/ specific surface area ($m^2/g$)]×4×1000 (ii)

<Substitute Substance>

Caffeine (molecular formula: $C_8H_{10}N_4O_2$, molecular weight: 194.19, anhydrous caffeine by Kishida Chemical Co., Ltd.) was used as a substitute for low molecular weight substances (for example, cyclophosphamide (molecular weight: 279.10)).

Quinine (molecular formula: $C_{20}H_{24}N_2O_2$, molecular weight: 324.42 (quinine sulfate dihydrate, product of Kanto Kagaku Co., Ltd.)) was used as a substitute for medium molecular weight substances (for example, mitomycin (molecular weight: 334.33)).

Hematoporphyrin (molecular formula: $C_{34}H_{38}N_4O_6$, molecular weight: 598.69 (Hematoporphyrin, by Wako Pure Chemical Industries, Ltd.)) was used as a substitute for high molecular weight substances (for example, irinotecan (molecular weight: 677.18)).

These three alkaloid substitute substances have molecular weights approximating those of drug molecules of anticancer agents (drug components). They were therefore employed with the assumption that their adsorbing behavior with activated carbon is also similar <Preparation of Test Solutions of Substitute Substances>

An aqueous solution of caffeine (pH: 7.2) was prepared by dissolving 100 mg of anhydrous caffeine in 1 L of ion-exchanged water.

An aqueous solution of quinine (pH: 6.8) was also prepared by dissolving 120.7 mg of quinine sulfate dihydrate in 1 L of ion-exchanged water.

An aqueous solution of hematoporphyrin (pH 5.1) was prepared by dissolving 117.65 mg of hematoporphyrin in 100 mL of ethanol, and then adding ion-exchanged water to the ethanol solution to a total amount of 1 L.

<Test and Evaluation Method>

A 25 mg portion of each adsorbing material was weighed out and added to a 100 mL Erlenmeyer flask. In the Erlenmeyer flask there was poured 50 mL of the aqueous solution of caffeine, 50 mL of the aqueous solution of quinine or 50 mL of the aqueous solution of hematoporphyrin, depending on the test solution of the substitute substance to be measured. One type of test solution of the substitute substance in the Erlenmeyer flask was used for each adsorption measurement. That is, test solutions of two different substitute substances were not placed in the Erlenmeyer flask at the same time.

After pouring 50 mL of the test solution of the substitute substance in the Erlenmeyer flask (100 mL) containing the adsorbing material (25 mg), the Erlenmeyer flask was shaken for 60 minutes. The shaken solution was suction filtered with a 0.45 μm membrane filter, to obtain filtrates for each of the test solutions of the individual adsorbing materials. For caffeine and quinine, a TOC meter (TOC-V by Shimadzu Corp.) was used to measure the TOC concentration in the filtrate, and this was compared with the original aqueous solution, recording the amount of reduction as the adsorption by the adsorbing material. For hematoporphyrin, a spectrophotometer (UVmini-1240 by Shimadzu Corp.) was used to measure the absorbance of the filtrate, and this was compared with the original aqueous solution, recording the amount of reduction in absorbance as the adsorption by the adsorbing material. Two measurements were made for each adsorbing material (n=2), and the arithmetic mean was calculated.

The adsorption rate (%) was calculated as: {(Original concentration of test solution)−(concentration of filtrate after filtration)}/(original concentration of test solution)× 100. The results are shown in Tables 2 and 3. For each adsorbing material, the form, starting material source, mean particle size (μm), mean pore diameter (nm), pore volume ($V_D$) ($cm^3/g$) by the DH plot method, caffeine adsorption rate (%), quinine adsorption rate (%), hematoporphyrin adsorption rate (%) and overall evaluation (3-level scale of A, B or F) were recorded. For the overall evaluation, adsorbing materials that had adsorption rates of 50% or higher for all of the three different substitute substances were evaluated as "A". Adsorbing materials that had adsorption rates of 50% or higher for two of the three different substitute substances were evaluated as "B", and adsorbing materials that had adsorption rates of less than 50% for two of the three different substitute substances were evaluated as "F".

TABLE 2

| Adsorbing material | Adsorptive activated carbon 1 | Adsorptive activated carbon 2 | Adsorptive activated carbon 3 | Adsorptive activated carbon 4 | Adsorptive activated carbon 5 |
|---|---|---|---|---|---|
| Form | Powder | Powder | Powder | Powder | Powder |
| Source | Wood-based | Wood-based | Coconut shell | Coconut shell | Coal-based |
| Median diameter (μm) | 34 | 20 | 18 | 17 | 28 |
| Mean pore diameter (nm) | 4.62 | 2.88 | 1.98 | 1.79 | 2.08 |
| DH plot pore volume ($V_D$) (cm$^3$/g) | 1.7393 | 0.4823 | 0.2075 | 0.0869 | 0.2380 |
| Caffeine adsorption (%) | 89 | 94 | 95 | 95 | 86 |
| Quinine adsorption (%) | 90 | 72 | 93 | 69 | 67 |
| Hematoporphyrin adsorption (%) | 100 | 51 | 100 | 30 | 41 |
| Overall evaluation | A | A | A | B | B |

TABLE 3

| Adsorbing material | Adsorptive activated carbon 6 | Adsorptive activated carbon 7 | Adsorptive activated carbon 8 | Synthetic zeolite |
|---|---|---|---|---|
| Form | Powder | Powder | Powder | Powder |
| Source | Coconut shell | Coconut shell | Phenol resin-based | — |
| Median diameter (μm) | 15 | 15 | 15 | 7 |
| Mean pore diameter (nm) | 1.67 | 1.64 | 1.65 | — |
| DH plot pore volume ($V_D$) (cm$^3$/g) | 0.0381 | 0.0299 | 0.0319 | — |
| Caffeine adsorption (%) | 96 | 96 | 93 | 1 |
| Quinine adsorption (%) | 38 | 10 | 35 | 2 |
| Hematoporphyrin adsorption (%) | 26 | 8 | 33 | 1 |
| Overall evaluation | F | F | F | F |

<Adsorption Rate>

Synthetic zeolite exhibited essentially no adsorbing effect in this experiment system. The superiority of the activated carbon was clear in comparison. Judging from adsorptive activated carbons 1 to 8, the adsorption was satisfactory for low-molecular-weight molecules, collectively represented by caffeine. With higher molecular weight, however, such as quinine and hematoporphyrin, the adsorption rate was reduced.

The difference in mean pore diameter is a first aspect that may be examined. Specifically, adsorptive activated carbons 1 to 5 had mean pore diameters of 1.7 nm or greater. However, those of adsorptive activated carbons 6 to 8 were less than 1.7 nm. Therefore, a mean pore diameter of 1.7 nm or greater may be used as an important demarcating index for evaluating the adsorption performance. Considering the results from measurement of the physical properties, the upper limit for the mean pore diameter is thought to be about 5 nm, based on adsorptive activated carbon 1.

In addition, in order to improve the adsorption efficiency for molecules with a wide range of molecular weights, a second aspect that may be examined is the pore volume as determined by the DH plot method. Specifically, adsorptive activated carbons 1 to 5 had pore volumes of 0.08 cm$^3$/g or greater (with pore diameters of 1 to 100 nm). However, those of adsorptive activated carbons 6 to 8 were less than 0.08 cm$^3$/g. Thus, a pore volume of 0.08 cm$^3$/g or greater may also be considered to be a useful demarcating index for evaluation of the adsorption performance, in addition to the mean pore size. Considering the results of measurement of the physical properties, the upper limit for the pore volume as described by the DH plot method is thought to be about 2 cm$^3$/g, based on adsorptive activated carbon 1.

Based on these results, activated carbon may be considered excellent for efficiently adsorbing molecules with a wide range of molecular weights. Activated carbon also has variation in the molecular weights that it adsorbs. The performance of the activated carbon may therefore be selected by adding the index of mean pore diameter and the index of pore volume as described by the DH plot method (in a pore diameter range of 1 to 100 nm). The adsorption efficiency can therefore be further increased for molecules with a wide range of molecular weights.

[Performance Evaluation and Selection by Using Anticancer Agents]

Having obtained these results for performance evaluation using substitute substances as described above, the actual adsorption performance of anticancer agents by adsorbing materials was then verified. Three anticancer agents were prepared: 5-fluorouracil (5-FU by Kyowa Hakko Kirin Co., Ltd., 250 mg injection), cyclophosphamide (Endoxan$^R$ for injection by Shionogi & Co., Ltd., 500 mg) and methotrexate (Methotrexate$^R$ by Pfizer, 200 mg intravenous infusion). The anticancer agents were prepared as test solutions to a concentration of 1 mg/mL for 5-fluorouracil, 1 mg/mL for cyclophosphamide and 1 mg/mL for methotrexate.

<Anticancer Agent Adsorption Test and Evaluation Method>

The adsorbing materials used were "adsorptive activated carbon 1 (wood-based)", "adsorptive activated carbon 3 (coconut shell)" and "synthetic zeolite", mentioned above. A 1.25 g portion of each adsorbing material was weighed out and added to a 100 mL Erlenmeyer flask. Into each Erlenmeyer flask there was poured a test solution of 50 mL of an aqueous solution of 5-fluorouracil, 50 mL of an aqueous solution of cyclophosphamide or 50 mL of an aqueous solution of methotrexate. One type of test solution of the anticancer agent in the Erlenmeyer flask was used for each adsorption measurement. That is, test solutions of two different anticancer agents were not placed in the Erlenmeyer flask at once.

After pouring 50 mL of the test solution of the anticancer agent in the Erlenmeyer flask (100 mL) containing the adsorbing material (1.25 g), the Erlenmeyer flask was shaken for 60 minutes. The shaken solution was suction filtered with a 0.45 μm membrane filter, to obtain filtrates for each of the test solutions of the individual adsorbing materials. Next, the filtrate was measured by HPLC (L-2000 Series, product of Hitachi High-Technologies Corp.). The three different anticancer agents were analyzed with a Shodex$^R$ C18P4E column, thickness: 5 μm, inner diameter: 4.6 mm, length: 250 mm (product of Showa Denko K. K.). In addition, an example in which only the anticancer agent test solution was poured in, without loading the adsorbing material, was used as a control group (blank), the peak area in HPLC analysis for the control group being defined as 100%. The peak area for each sample was then calculated, and the concentration of the anticancer agent in each sample was calculated from the area ratio. Five measurements were conducted for each sample, and the arithmetic mean was taken.

The adsorption rate (%) was calculated as: {(Concentration of solution without adsorbing material)−(concentration of solution after adsorption with adsorbing material)}/(concentration of solution without adsorbing material)×100. The results are shown in Table 4. For each adsorbing material, the form, starting material source, mean particle size (μm), mean pore diameter (nm), pore volume ($V_D$) (cm$^3$/g) by the DH plot method, 5-fluorouracil adsorption rate (%), cyclophosphamide adsorption rate (%), methotrexate adsorption rate (%) and overall evaluation (3-level scale of A, B or F) were recorded. For the overall evaluation, adsorbing materials that had adsorption rates of 50% or higher for all of the three different anticancer agents were evaluated as "A". Adsorbing materials that had adsorption rates of 50% or higher for two of the three different anticancer agents were evaluated as "B", and adsorbing materials that had adsorption rates of less than 50% for two of the three different anticancer agents were evaluated as "F".

TABLE 4

| Adsorbing material | Adsorptive activated carbon 1 | Adsorptive activated carbon 3 | Synthetic zeolite |
| --- | --- | --- | --- |
| Form | Powder | Powder | Powder |
| Source | Wood-based | Coconut shell | — |
| Median diameter (μm) | 34 | 18 | 7 |
| Mean pore diameter (nm) | 4.62 | 1.98 | — |
| DH plot pore volume ($V_D$) (cm$^3$/g) | 1.7393 | 0.2075 | — |
| 5-Fluorouracil adsorption (%) | 73.3 | 86.5 | 0.0 |
| Cyclophosphamide adsorption (%) | 85.1 | 99.8 | 0.0 |
| Methotrexate adsorption (%) | 94.1 | 99.2 | 0.0 |
| Overall evaluation | A | A | F |

<Adsorption Rate Using Anticancer Agents>

The results of the performance evaluation using anticancer agents showed that synthetic zeolite exhibited virtually no adsorption effect, similar to the evaluation with the substitute substances. In contrast, the examples of activated carbon were all confirmed to have satisfactory adsorption effects for all of the anticancer agents. The anticancer agents used here were of three types with different molecular weights. The activated carbon exhibited sufficient adsorption performance for each of the anticancer agents. The adsorption effect of activated carbon for anticancer agents was therefore very high. A correlation with the evaluation using the substitute substances was also confirmed.

[Fabrication of Anticancer Agent Adsorbing Sheet Body]

Based on the results of the performance evaluation for adsorptive activated carbon in the drug solution-permeating section and drug solution absorbing layer, the present inventors fabricated three different anticancer agent adsorbing sheet bodies (sheet bodies 1, 2 and 3). For fabrication, the construction of the third embodiment shown in FIG. 3 was employed for sheet bodies 1 and 2. The drug solution absorbing layer for the fabrication example was formed by layering an activated carbon-containing sheet member that contained adsorptive activated carbon, a water-swelling resin member and a fibrous absorbing sheet member, in that order. The construction of the second embodiment shown in FIG. 2 was employed for sheet body 3. The drug solution absorbing layer for the fabrication example was formed by layering an activated carbon-containing sheet member that contained adsorptive activated carbon and a fibrous absorbing sheet member, in that order.

<Fabrication of Sheet Body 1>

For fabrication of the sheet body 1, adsorptive activated carbon 1 was employed as the adsorptive activated carbon of the activated carbon-containing sheet member. Adsorptive activated carbon 1 and pulverized conifer pulp were loaded into a water tank and stirred to form a slurry. The slurry was finished into a sheet by a paper-making procedure and dried (fabrication of activated carbon-containing sheet member). The finished activated carbon-containing sheet member had a basis weight of 25 g/m$^2$ and an adsorptive activated carbon content of 30%. Granules of a crosslinked acrylic acid polymer partial sodium salt (product of Sumitomo Seika Chemicals Co., Ltd.) were placed on the lower layer side of the activated carbon-containing sheet member, as a water-swelling resin member, and ground pulp (product of Weyerhaeuser Company) was set on their lower layer side, as a fibrous absorbing sheet member. The three members were layered for provisional fabrication of a drug solution absorbing layer.

Figure 4:
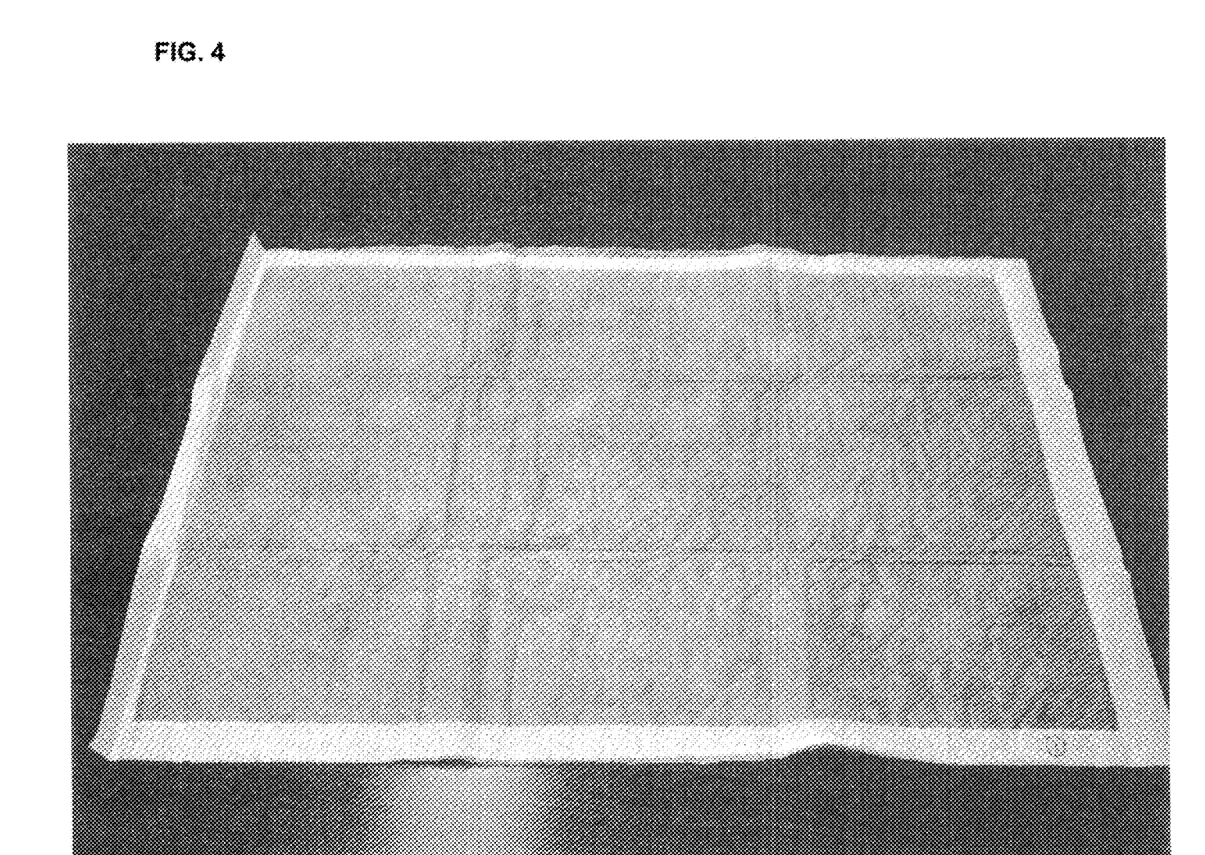
FIG. 4 is a photograph showing a fabricated anticancer agent adsorbing sheet body in full.

The fabric member 4 was used for the drug solution-permeating section. The nonwoven fabric of the fabric member 4 was situated on the top side of the provisionally fabricated drug solution absorbing layer, and the members were passed through embossing rollers for compaction (embossing and hot-melt bonding) to attach each layer member. The embossing pattern was a parallel longitudinal striped pattern with spacings. On the lower side of the resulting integrated drug solution-permeating section and drug solution absorbing layer (the lower side of the drug solution absorbing layer) there was placed a polyethylene synthetic resin sheet (product of Fukusuke Kogyo Co., Ltd., thickness: 20 μm) to serve as the permeation preventing section, and these were adhesively anchored to each other with an adhesive (product of Henkel Japan, Ltd.). Coating of the adhesive was also in a parallel longitudinal striped pattern with spacings. The drug solution-permeating section and permeation preventing section were increased by at least 1 cm on all four sides, as necessary to cover the drug solution absorbing layer. The fabricated anticancer agent adsorbing sheet body is shown in the photograph of FIG. 4, having a size of approximately 59 cm×44 cm, and a maximum thickness of about 3 mm.

<Fabrication of Sheet Body 2>

For fabrication of sheet body 2, the activated carbon used in sheet body 1 was changed to adsorptive activated carbon 3. The other materials and methods used for fabrication were all the same.

<Fabrication of Sheet Body 3>

For fabrication of sheet body 3, the water-swelling resin member used in sheet body 1 was omitted. The other materials and methods used for fabrication were all the same.

[Anticancer Agent Adsorption Test]

The present inventors measured the adsorption capacities of the three fabricated anticancer agent adsorbing sheet bodies (sheet bodies 1, 2 and 3), using anticancer agents that are representative of those prescribed in the clinic for current chemotherapy. The anticancer agent drug molecules supplied for the test were of four different molecular weights: 5-fluorouracil (5 FU by Kyowa Hakko Kirin Co., Ltd., 250 mg injection), cyclophosphamide (Endoxan$^R$ for injection by Shionogi & Co., Ltd., 500 mg), methotrexate (Methotrexate$^R$ by Pfizer, 200 mg intravenous infusion) and paclitaxel (Taxol$^R$ by Bristol-Meyers, 30 mg injection).

The anticancer agent concentrations were adjusted to 50 mg/mL for 5-fluorouracil, 40 mg/mL for cyclophosphamide, 25 mg/mL for methotrexate and 6 mg/mL for paclitaxel. Physiological saline was used for their dilution. The diluted solutions of each anticancer agent were dropped in equal amounts of 10 μL at 9 locations on the drug solution-permeating section of the anticancer agent adsorbing sheet body. Immediately after dropping, a resin bag containing physiological saline (500 mL PL SOFA physiological saline, product of Fuso Pharmaceutical Industries, Ltd.) was placed on its side on the diluted solution of each anticancer agent, and the sack portion of the physiological saline bag was allowed to stand for 30 seconds.

As control groups for comparison with the anticancer agent adsorbing sheet body, each anticancer agent diluted solution was dropped under the same conditions onto a smooth stainless steel plate, instead of the anticancer agent adsorbing sheet body. A physiological saline bag was similarly placed on its side and the sack portion was allowed to stand for 30 seconds.

The physiological saline bag was then lifted up, and the sack portion was wiped with absorbent cotton and 5 mL of purified water. The absorbent cotton and purified water were collected, and the supernatant liquid from centrifugal separation was separated off. The supernatant liquid was measured by HPLC (L-2000 Series, product of Hitachi High-Technologies Corp.). The four different anticancer agents were analyzed with a Shodex$^R$ C18P4E column, thickness: 5 μm, inner diameter: 4.6 mm, length: 250 mm (product of Showa Denko K. K.).

The peak areas of the control groups (dropping on a stainless steel plate) in HPLC analysis were defined as 100%. The peak area for each sample was then calculated, and the concentration of the anticancer agent in each sample was calculated from the area ratio. The relative adsorption rates (%) of the sheet bodies 1, 2 and 3 for the four different anticancer agents were thus calculated. For the adsorption rate, five measurements were conducted for each sample and the arithmetic mean was taken.

<Results for Adsorption Rate>

The results for the adsorption rate were as shown in Table 5. Listed are the materials and the relative adsorption rates (%) of the 4 anticancer agents, 5-fluorouracil, cyclophosphamide, methotrexate and paclitaxel, for the sheet bodies 1, 2 and 3. In addition, as an overall evaluation, samples that had adsorption rates of 99% or higher for both of the anticancer agents were given an overall evaluation of "A". Samples with less than 99% for either of the anticancer agents were given an evaluation of "F".

TABLE 5

|  | Sheet body 1 | Sheet body 2 | Sheet body 3 |
|---|---|---|---|
| Structure | 3rd embodiment (see FIG. 3) | 3rd embodiment (see FIG. 3) | 2nd embodiment (see FIG. 2) |
| Drug solution-permeating section | Fabric member 4 | Fabric member 4 | Fabric member 4 |
| Drug solution absorbing layer | Adsorptive activated carbon 1 | Adsorptive activated carbon 3 | Adsorptive activated carbon 1 |
|  | Water-swelling resin member | Water-swelling resin member | — |
|  | Fibrous absorbing sheet member | Fibrous absorbing sheet member | Fibrous absorbing sheet member |
| Permeation preventing section | PE film | PE film | PE film |
| 5-Fluorouracil adsorption (%) | 100.0 | 100.0 | 100.0 |
| Cyclophosphamide adsorption (%) | 100.0 | 100.0 | 100.0 |
| Methotrexate adsorption (%) | 100.0 | 100.0 | 99.99 |
| Paclitaxel adsorption (%) | 100.0 | 100.0 | 99.15 |
| Overall evaluation | A | A | A |

<Adsorption Rate>

All of the sheet bodies 1, 2 and 3 received an overall evaluation of "A". In particular, all of the anticancer agent adsorbing sheet bodies essentially fully adsorbed the drug molecules of anticancer agents very satisfactorily, the drug molecules of anticancer agents used in the test having a wide range of molecular weights, from 5-fluorouracil to paclitaxel. Moreover, when the results are considered separately, sheet bodies 1 and 2 comprised water-swelling resin members in the drug solution absorbing layers, and therefore had increased absorption performance for the drug solutions. It is thought likely that their adsorption rates for drug molecules of anticancer agents were increased over sheet body 3 due to increased overall absorption performance. In light of the above, the performance evaluation results for adsorptive activated carbon using substitute substances, and the adsorption results for activated carbon itself for anticancer agents, provide support that the anticancer agent adsorbing sheet body is suitable for adsorption of drug molecules of anticancer agents having a wide range of molecular weights.

Therefore, the anticancer agent adsorbing sheet body is useful for ensuring the safety of workers and medical-related staff during preparation of anticancer agents, and in clinical settings. In particular, since the adsorption performance for drug molecules of anticancer agents is highly satisfactory, it is also effective as a measure against secondary contamination during working periods. In addition, the structural materials are relatively inexpensive and can be introduced at sites without excessive financial burden.

INDUSTRIAL APPLICABILITY

The anticancer agent adsorbing sheet body of the invention has high adsorption performance that is specialized for adsorption of drug molecules of anticancer agents, compared to the existing water-absorbing sheets. It can therefore contribute greatly to ensuring the safety of persons engaged in the preparation of anticancer agents. Thus, it is highly effective as a substitute for water-absorbing sheets or drapes to be used in for preparation of existing anticancer agents, or in clinical settings for the same.

REFERENCE SIGN LIST 1A, 1B, 1C Anticancer agent adsorbing sheet bodies
10a, 10b, 10c Drug solution absorbing layers
11 Activated carbon-containing sheet member
12 Fibrous absorbing sheet member
13 Water-swelling resin member
18 First surface of drug solution absorbing layer
19 Second surface of drug solution absorbing layer
20 Drug solution-permeating section
30 Permeation preventing section
40 Edge section

The invention claimed is:

1. An anticancer agent adsorbing sheet body comprising, in a laminated form,
   a drug solution absorbing layer that absorbs a drug solution containing a drug molecule of an anticancer agent,
   a drug solution-permeating section situated on a first surface side of the drug solution absorbing layer, that causes a drug solution to permeate to the drug solution absorbing layer side, and
   a permeation preventing section situated on the second surface side of the drug solution absorbing layer, that prevents leakage of the drug solution from the drug solution absorbing layer side,
   wherein the drug solution absorbing layer comprises an activated carbon-containing sheet member that contains adsorptive activated carbon,
   the adsorptive activated carbon has a physical property with a mean pore diameter of 1.7 to 5 nm,
   the drug solution-permeating section is a resin fiber fabric member, and
   the permeation preventing section is a resin sheet member.

2. The anticancer agent adsorbing sheet body according to claim 1, wherein the drug molecule is a non-volatile molecule.

3. The anticancer agent adsorbing sheet body according to claim 1, wherein the molecular weight of the drug molecule is 100 to 1000.

4. The anticancer agent adsorbing sheet body according to claim 1, wherein the adsorptive activated carbon has a physical property such that the pore volume of pores with pore diameter of 1 to 100 nm is 0.08 $cm^3/g$ or greater per unit weight of the adsorptive activated carbon, as measured by the DH plot method.

5. The anticancer agent adsorbing sheet body according to claim 1, wherein the drug solution-permeating section has a water retention of no greater than 500% in a water-retention test according to JIS L 1913 (2010).

6. The anticancer agent adsorbing sheet body according to claim 1, wherein the drug solution-permeating section is a nonwoven fabric of synthetic resin fibers.

7. The anticancer agent adsorbing sheet body according to claim 1, wherein the drug solution absorbing layer comprises an activated carbon-containing sheet member that contains adsorptive activated carbon, and a fibrous absorbing sheet member.

8. The anticancer agent adsorbing sheet body according to claim 7, wherein the activated carbon-containing sheet member is situated on the first surface side of the drug solution absorbing layer, and the fibrous absorbing sheet member is situated on the second surface side of the drug solution absorbing layer.

9. The anticancer agent adsorbing sheet body according to claim 1, wherein the drug solution absorbing layer comprises an activated carbon-containing sheet member that contains adsorptive activated carbon, a water-swelling resin member and a fibrous absorbing sheet member.

10. The anticancer agent adsorbing sheet body according to claim 9, wherein the activated carbon-containing sheet member is situated on the first surface side of the drug solution absorbing layer and the fibrous absorbing sheet member is situated on the second surface side of the drug solution absorbing layer, and the water-swelling resin member is provided between the activated carbon-containing sheet member and the fibrous absorbing sheet member.

11. The anticancer agent adsorbing sheet body according to claim 7, wherein the fibrous absorbing sheet member is formed of a cellulose component.

12. The anticancer agent adsorbing sheet body according to claim 9, wherein the fibrous absorbing sheet member is formed of a cellulose component.

* * * * *